Patented July 13, 1926.

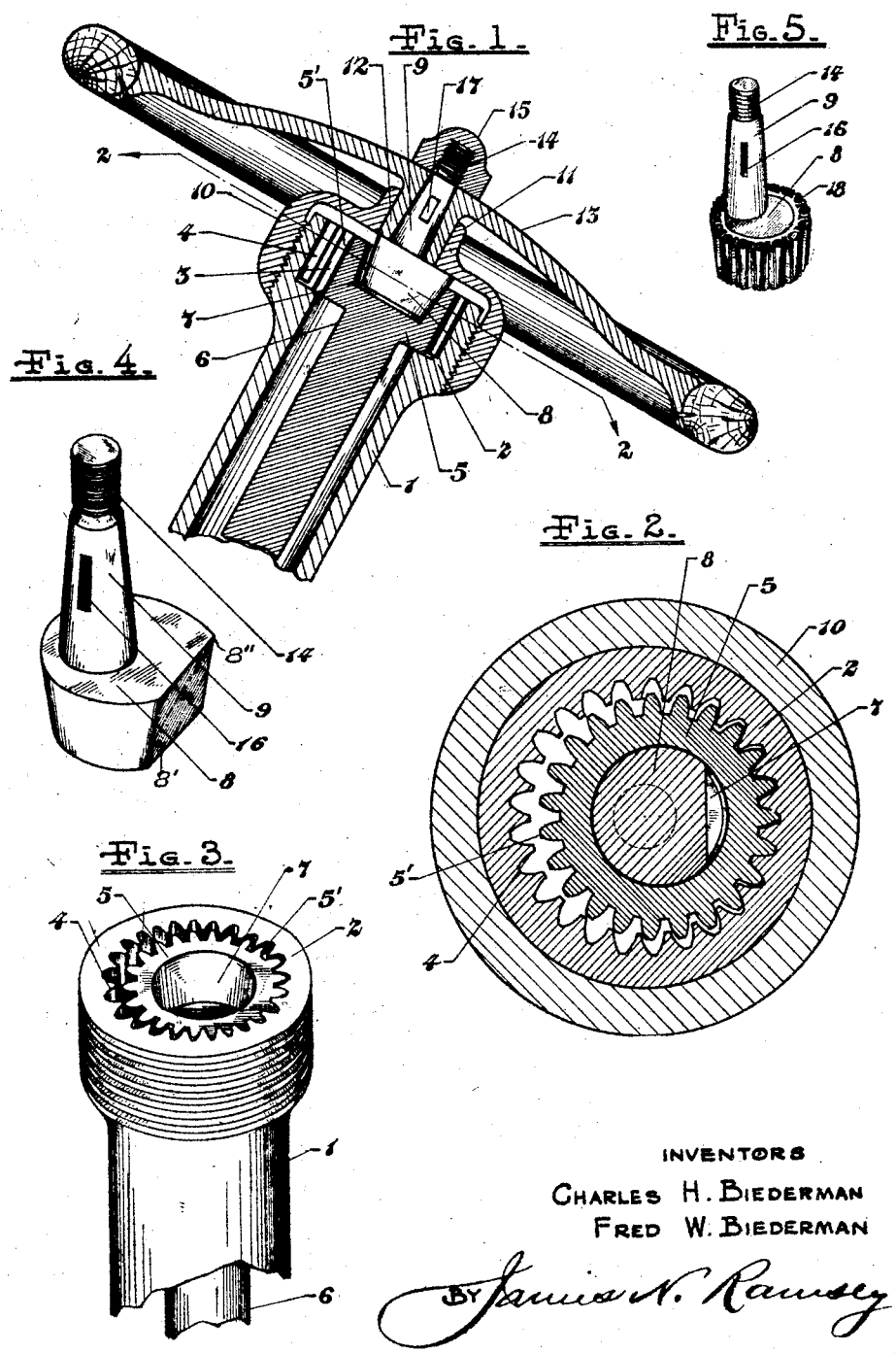

1,592,714

UNITED STATES PATENT OFFICE.

CHARLES H. BIEDERMAN AND FRED W. BIEDERMAN, OF CINCINNATI, OHIO.

REDUCTION GEAR.

Application filed May 31, 1922. Serial No. 564,862.

Our invention relates to improvements in reduction gears and more particularly to gears adapted to be used for steering automobiles and the like.

The objects of our invention are to eliminate lost motion especially when reversing the gearing in either direction, to compensate for all wear, to provide a large and powerful operative engaging contact and to obtain control of the ratio of reduction, as for instance, 10 to 1 or 100 to 1 and to provide a wearing surface of such volume as to produce long life.

Our invention consists in the combination of a stationary gear, a floating gear arranged therein and an eccentric mounted in the floating gear and which is made to operate smoothly in either direction preferably without lost motion.

Our invention also consists in the parts and in the construction, combination and arrangement of parts as herein set forth and claimed.

In the drawing:—

Fig. 1 is a vertical section of our invention shown applied to an automobile steering wheel and post and casing;

Fig. 2 is a section on the line 2—2 of Fig. 1;

Fig. 3 is a perspective view of the two gears used to accomplish our purpose and the upper portion of a steering rod and steering casing;

Fig. 4 is a perspective view of an eccentric tapered head having a tapered stem on the large end thereof; and Fig. 5 is a perspective view showing a modification of an eccentric.

In the embodiment of our invention as illustrated and which shows a preferred construction the upper end of stationary casing 1 is provided with a head 2 having a cylindrical bore 3 arranged concentric of said head and of said casing and having gear teeth 4 arranged circumferentially thereof. Said head and casing are adapted to receive floating gear 5 and steering post 6 or driven shaft, respectively. Floating gear 5 is provided with tapered recess 7 in its upper end adapted to receive tapered eccentric 8 having tapered stem 9 thereon. Cap 10 is preferably screwed on head 2 but may be otherwise fixed thereon and is provided with a tubular flange bearing 11 adapted to receive tubular stud 12 of steering wheel 13. Said tubular stud is tapered interiorly to receive tapered stem 9 which is provided with threads 14 to receive nut 15 by which the steering wheel 13 is held in place. Said stem 9 is also provided with a keyway 16 to receive key 17 projecting into stud 12 whereby said eccentric is caused to rotate when the wheel is turned upon its axis. Only part of the teeth 5' of floating gear 5 are in engagement with part of the teeth 4 of stationary head 2 at any one time, the remaining teeth 5' and 4 respectively being out of mesh, and the stationary gear having more teeth than the floating gear, when the latter is rotated the eccentric will cause the teeth of the floating gear to constantly engage the teeth of the stationary gear so that in making a complete revolution of any one tooth of the floating gear it will skip one tooth or more as the case may be of the stationary gear and thereby reduce the operative engagement, or ratio of said gears accordingly. Inasmuch as part of the teeth of the floating gear are in full mesh with part of the teeth of the stationary gear at all times there is no jarring or lost motion between the gears when reversing the direction of the floating gear or at any other time.

Eccentric 8 has flat surface 8' on its outer periphery and adapted to face toward recess 7 of floating gear 5. Stem 9 is positioned on eccentric 8 so that a line drawn parallel to the top surface of the eccentric toward the stem from the middle of chord 8'' and perpendicular thereto is adapted to diametrically extend through the base of the stem positioned adjacent the outer circular edge of the eccentric.

The cut away side of the eccentric which by way of illustration is shown as flat surface 8' provides particular advantages inasmuch as the counteracting lines of force are diverted, which prevents lost motion because the lines of force are transmitted from the eccentric gear 5 to the eccentric 8 at right angles to the contact point or zone of teeth pressure.

Another advantage of our invention is that there is minimized possibility of breaking the steering mechanism as floating gear 5 integrally connected to the top of steering post 6 has a plurality of teeth 5' in continuous mesh with a plurality of teeth 4 in head 2, as clearly shown in Fig. 3.

The engagement of a plurality of gear teeth, as shown in our construction, provides a device adapted to withstand considerable force which may be applied in a direction adapted to shear the teeth.

Our invention is especially adapted for use in steering mechanism for the reason that steering post 6 has considerable length and, therefore, the eccentric movement of floating gear 5 is almost entirely rectified with reference to the usual gear connection adjacent the lower end of the steering post.

Another advantage of our invention is that stem 9 is fitted in a tapered bearing in tubular stud 12 of steering wheel 13 and eccentric 8 is received in tapered recess 7 in floating gear 5. The upper end of stem 9 is provided with screw threads 14 to receive nut 15 in engagement with steering wheel 13, and cap 10 is threaded to head 2 and positioned relative to tubular stud 12 and eccentric 8 so that lost motion in our invention, caused by wear, may be taken up and properly adjusted from the driver's seat. The tapered eccentric 8 being vertically adjustable provides means for securing a desired relation between eccentric 8, gear teeth 5' and gear teeth 4 whereby lost motion is adapted to be taken up and proper adjustment made.

Lost motion in our steering mechanism is also provided for by flat surface 8' on eccentric 8 and so positioned relative to stem 9 that the eccentric has one contact point on each side of its neutral eccentric contact point. This construction permits motion to be imparted instantly by pressure of eccentric 8 in either direction relative to floating gear 5, whereby the direction of rotation of steering wheel 13 may be reversed instantly and the direction of rotation of steering post 6 is changed substantially simultaneously with the change of motion imparted to the steering wheel.

If disconnected at its lower end steering post 6 and floating gear 5 are removable from casing 1, when steering wheel 13, taper pin 9, eccentric 8 and cap 10 are disassembled.

While our invention is particularly adapted for use in steering posts for motor cars whereby the wheels may be readily turned to right or left through the medium of our reduction gear with perfect ease and without the slightest jarring effect or loss of motion, it is understood that it is not limited thereto but may be used in various other situations where a reduction in gear is required.

Our invention is capable of modification without departing from the scope or spirit thereof as defined in the claims, as for instance, the cam may be provided with roller bearings 18 as illustrated in Fig. 5 or other frictionless bearings. This modification is preferably intended to increase the efficiency of the reduction gear wherein big reduction or high speed is desired.

What we claim as new and desire to secure by Letters Patent is:

1. In steering mechanism, a stationary gear, a floating gear mounted in said stationary gear and in continuous mesh therewith, an eccentric mounted in said floating gear and in continuous engagement therewith, a steering wheel connected to said eccentric, and a steering post substantially integral with said floating gear.

2. In steering mechanism, a stationary gear having teeth arranged circumferentially therein, a floating spur gear mounted in said stationary gear and having fewer teeth than said stationary gear, and in continuous mesh with a side thereof, an eccentric mounted in said floating gear and in continuous engagement therewith, a steering wheel connected with said eccentric and a shaft substantially integral with said floating gear.

3. In steering mechanism, a stationary gear having teeth arranged circumferentially therein, a floating spur gear mounted therein and having fewer teeth than said stationary gear and in continuous mesh therewith, an eccentric mounted in said floating gear and having a flat side, a steering wheel connected with said eccentric and a steering post substantially integral with said floating gear.

4. In a steering mechanism, a steering post casing, a stationary internal gear integral with the upper end thereof, a floating spur gear mounted in said internal gear and in continuous mesh therewith having a centrally disposed tapered hole therein, a tapered eccentric mounted in said hole, a tapered stem attached to said eccentric, a steering wheel attached to said stem, and a steering post mounted in said steering casing and integral with said floating spur gear.

5. In a steering mechanism, a steering post casing, a stationary internal gear integral with the upper end thereof, a floating spur gear mounted in said internal gear and in continuous mesh therewith having a centrally disposed hole therein, an eccentric mounted in said hole, a tapered stem attached to said eccentric, a steering wheel attached to said stem, and a steering post mounted in said steering casing and integral with said floating spur gear.

6. In steering mechanism, a steering column, a steering post mounted in said steering column, a stationary gear fixed to the upper end of said steering column, a floating gear mounted in said stationary gear and substantially integral with the upper end of said steering post and having a plurality of teeth in continuous mesh with said stationary gear, an eccentric mounted in said floating gear and having a flat side adjacent the inner side of said floating gear, a stem attached to said eccentric and extending upwardly and positioned adjacent the side of said eccentric opposite said flat surface, and a steering wheel secured to said stem.

7. In steering mechanism, a steering column, a steering post mounted in said steering column, a stationary gear fixed to the upper end of said steering column, a floating gear mounted in said stationary gear and substantially integral with the upper end of said steering post and having a plurality of teeth in continuous mesh with said stationary gear, an eccentric mounted in said floating gear, a stem attached to said eccentric and extending upwardly and positioned adjacent the side of said eccentric, and a steering wheel secured to said stem.

8. In steering mechanism, a stationary gear, a floating gear mounted in said stationary gear, a tapered eccentric mounted in said floating gear, a steering wheel connected to said eccentric and a steering post integral with said floating gear.

9. In steering mechanism, a stationary gear, a floating gear mounted in said stationary gear and in continuous mesh therewith, a tapered eccentric mounted in said floating gear and in continuous engagement therewith, a steering wheel connected to said eccentric and a steering post substantially integral with said floating gear.

10. In steering mechanism, a stationary gear, a floating gear mounted in said stationary gear and in continuous mesh therewith, a tapered eccentric having a flat side mounted in said floating gear and in continuous engagement therewith, a steering wheel connected to said eccentric and a steering post integral with said floating gear.

11. In steering mechanism, a steering column, a shaft mounted in said steering column, a stationary gear fixed to the upper end of said steering column, a floating gear mounted in said stationary gear and integral with the upper end of said shaft and having a plurality of teeth in continuous mesh with said stationary gear, a tapered eccentric mounted in said floating gear, a stem attached to said eccentric and a steering wheel secured to said stem.

12. In steering mechanism, a steering column, a shaft mounted in said steering column, a stationary gear fixed to the upper end of said steering column, a floating gear mounted in said stationary gear and integral with the upper end of said shaft floating therewith and having a plurality of teeth in continuous mesh with said stationary gear, a tapered eccentric mounted in said floating gear, a stem attached to said eccentric and a steering wheel secured to said stem.

CHARLES H. BIEDERMAN.
FRED W. BIEDERMAN.